(12) United States Patent
Kwon et al.

(10) Patent No.: US 11,186,308 B2
(45) Date of Patent: Nov. 30, 2021

(54) STEERING COLUMN ASSEMBLY FOR VEHICLE

(71) Applicant: MANDO CORPORATION, Gyeonggi-do (KR)

(72) Inventors: HyunBi Kwon, Gyeonggi-do (KR); Sang Hyun Park, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 139 days.

(21) Appl. No.: 16/384,831

(22) Filed: Apr. 15, 2019

(65) Prior Publication Data

US 2019/0322307 A1 Oct. 24, 2019

(30) Foreign Application Priority Data

Apr. 24, 2018 (KR) .................. 10-2018-0047192

(51) Int. Cl.
  *B62D 1/19* (2006.01)
(52) U.S. Cl.
  CPC .................. *B62D 1/192* (2013.01)
(58) Field of Classification Search
  CPC ......... B62D 1/192; B62D 1/195; B62D 1/181
  See application file for complete search history.

(56) References Cited

U.S. PATENT DOCUMENTS

| | | | | |
|---|---|---|---|---|
| 2013/0233117 A1* | 9/2013 | Read | ..................... | B62D 1/181 74/493 |
| 2016/0257333 A1* | 9/2016 | Ku | ......................... | B62D 1/181 |
| 2018/0281840 A1* | 10/2018 | Yoon | ..................... | B62D 1/192 |
| 2019/0225255 A1* | 7/2019 | Ishimura | ................ | B62D 1/181 |
| 2020/0207402 A1* | 7/2020 | Fricke | ................... | B62D 1/195 |
| 2020/0262466 A1* | 8/2020 | Specht | .................. | B62D 1/181 |

* cited by examiner

*Primary Examiner* — Darlene P Condra

(74) *Attorney, Agent, or Firm* — Ladas & Parry, LLP

(57) ABSTRACT

The present disclosure relates to a steering column for a vehicle including an upper column on which a bracket is fixed to an outer peripheral surface of the upper column, a lower column having an inner peripheral surface supported on the outer peripheral surface of the upper column and having a telescopic driving device fixed to a side corresponding to the bracket, a connecting member coupled to the telescopic driving device so as to be movable in the axial direction during a telescopic operation, and a bending plate fixed to the bracket and having one end being bent and spaced apart from a portion fixed to the bracket and coupled to the connecting member, thereby it is possible to perform the smooth collapse operation and to reduce the number of components, assembling process and cost of the steering column of the vehicle.

16 Claims, 13 Drawing Sheets

FIG.4
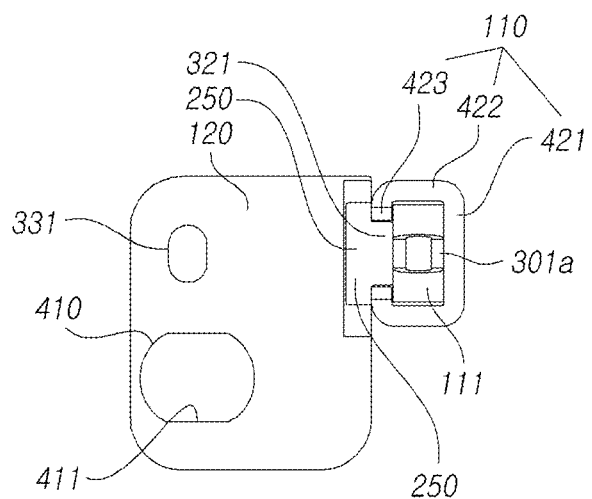
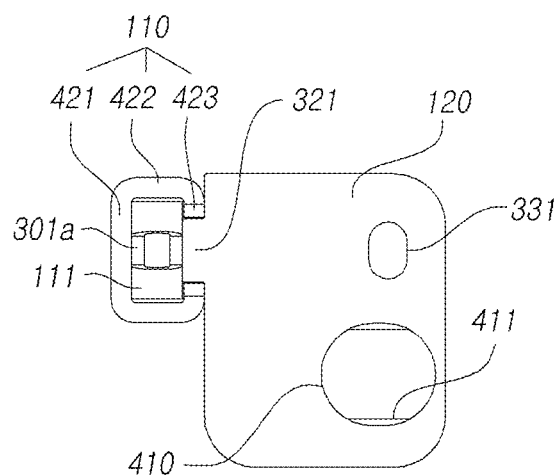

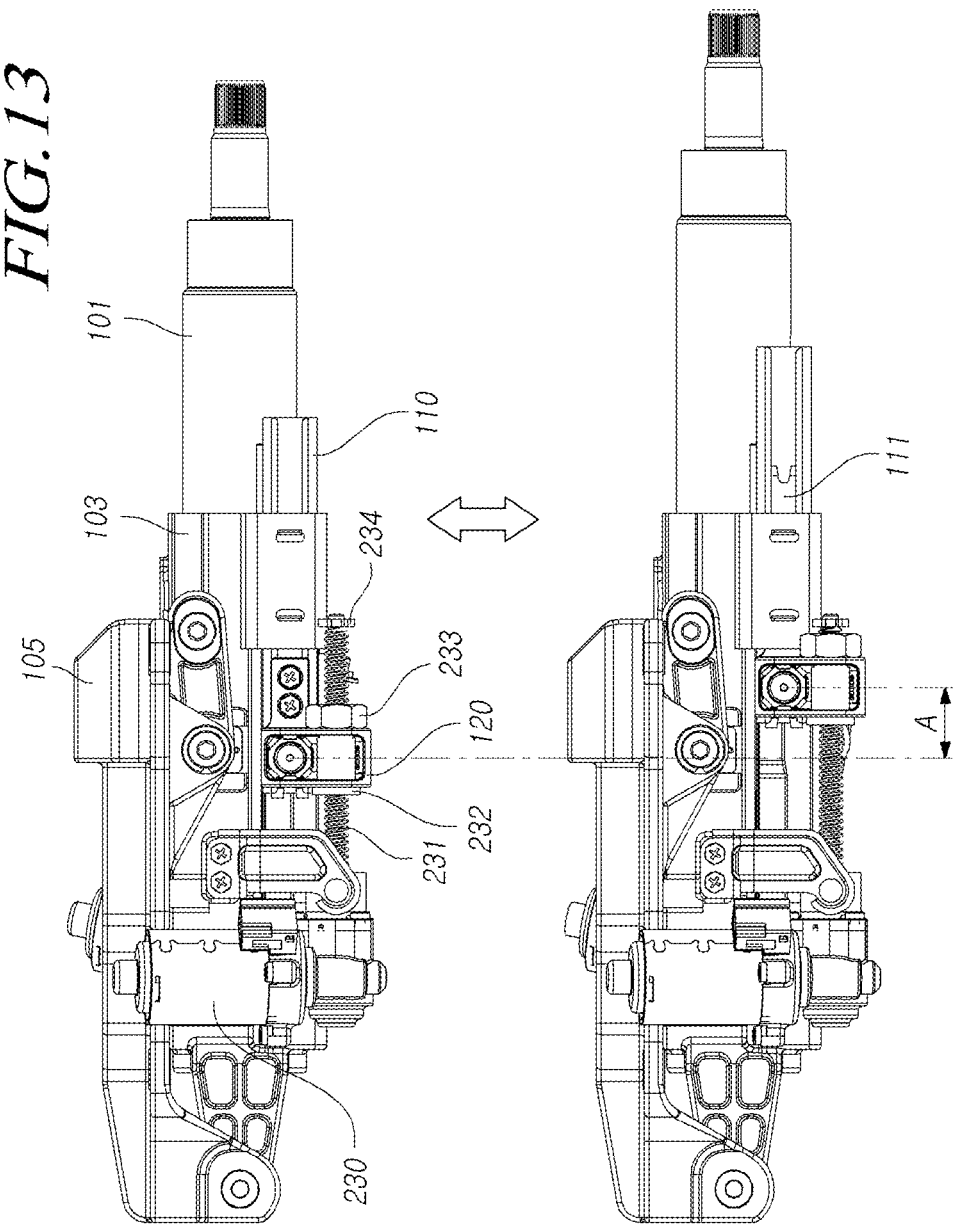

STEERING COLUMN ASSEMBLY FOR VEHICLE

CROSS REFERENCE TO RELATED APPLICATION

This application claims priority from Korean Patent Application No. 10-2018-0047192, filed on Apr. 24, 2018, which is hereby incorporated by reference for all purposes as if fully set forth herein.

BACKGROUND OF THE INVENTION

1. Field of the Invention

The present disclosure relates to a steering column for a vehicle, more particularly, to the steering column in which collapsed sliding parts and fixed parts of the steering column may be smoothly collapsed without interfering with each other.

More specifically, the present disclosure relates to an automotive steering column capable of improving the collision performance by reducing the number of components, assembling process and cost, and adjusting the impact load of the steering column generated when a vehicle collides based on the collision characteristic including the type of vehicle and driving state.

2. Description of the Prior Art

Generally, the steering column of the vehicle includes a telescope and a tilt function, which allows the driver to adjust the projection length of the steering wheel and tilt angle of the steering wheel according to the driver's height or body shape.

In addition, the steering column also may include a shock absorbing mechanism that axially contracts and absorbs shocks to prevent the driver's upper body from colliding with the steering wheel when the vehicle is impacted.

However, the impact applied to the steering wheel by the driver depends on the driver's condition, the type of vehicle and the driving state, and the amount of impact applied to the steering wheel varies depending on various situations such as the state of the seatbelt and airbag operation.

In order to prepare for such a situation, a steering apparatus having a capsule for absorbing the primary impact energy and a tearing plate for absorbing the secondary impact energy has been developed.

However, such a steering apparatus may be complicated to manufacture, and the manufacturing process may be increased and the vertical deformation may occur, so that there is a problem that the lateral deviation of the impact load due to the interference with the peripheral parts occurs.

SUMMARY OF THE INVENTION

For this background, an object of the present disclosure is to provide a steering column apparatus in which the collapsed parts and the fixed parts can be smoothly collapsed without interfering with each other in the event of a vehicle collision, and the number of parts, the assembly process and the manufacturing cost of the steering column can be reduced.

The another object of the present disclosure is to provide a steering column apparatus capable of improving the collision performance by adjusting the impact load of the steering column generated in the case of the vehicle collision based on the collision characteristics including the type of the vehicle and the running state.

The objects of the embodiments may be not limited thereto, and other objects may be clearly understood by those skilled in the art from the following description.

In accordance with an aspect of the present disclosure, there is provided a steering column for a vehicle including: an upper column on which a bracket is fixed to an outer peripheral surface of the upper column; a lower column having an inner peripheral surface supported on the outer peripheral surface of the upper column and having a telescopic driving device fixed to a side corresponding to the bracket; a connecting member coupled to the telescopic driving device so as to be movable in the axial direction during a telescopic operation; and a bent plate fixed to the bracket and having one end being bent and spaced apart from a portion fixed to the bracket and coupled to the connecting member.

According to the present disclosure, the collapsed parts and fixed parts can be collapsed smoothly without interfering with each other in a collision of the vehicle, and it is possible to reduce the number of parts, assembling process and cost of the steering column of the vehicle.

In addition, it is possible to improve the collision performance by adjusting the impact load of the steering column in the vehicle collision based on the collision characteristic including type of the vehicle, the running state and so on.

BRIEF DESCRIPTION OF THE DRAWINGS

FIG. 4 is a side view of the coupled state of parts of the steering column according to FIG. 3;

FIG. 13 is a side view illustrating the telescopic operating state of the steering column according to the present embodiments.

DETAILED DESCRIPTION OF THE EXEMPLARY EMBODIMENTS

Figure 1:
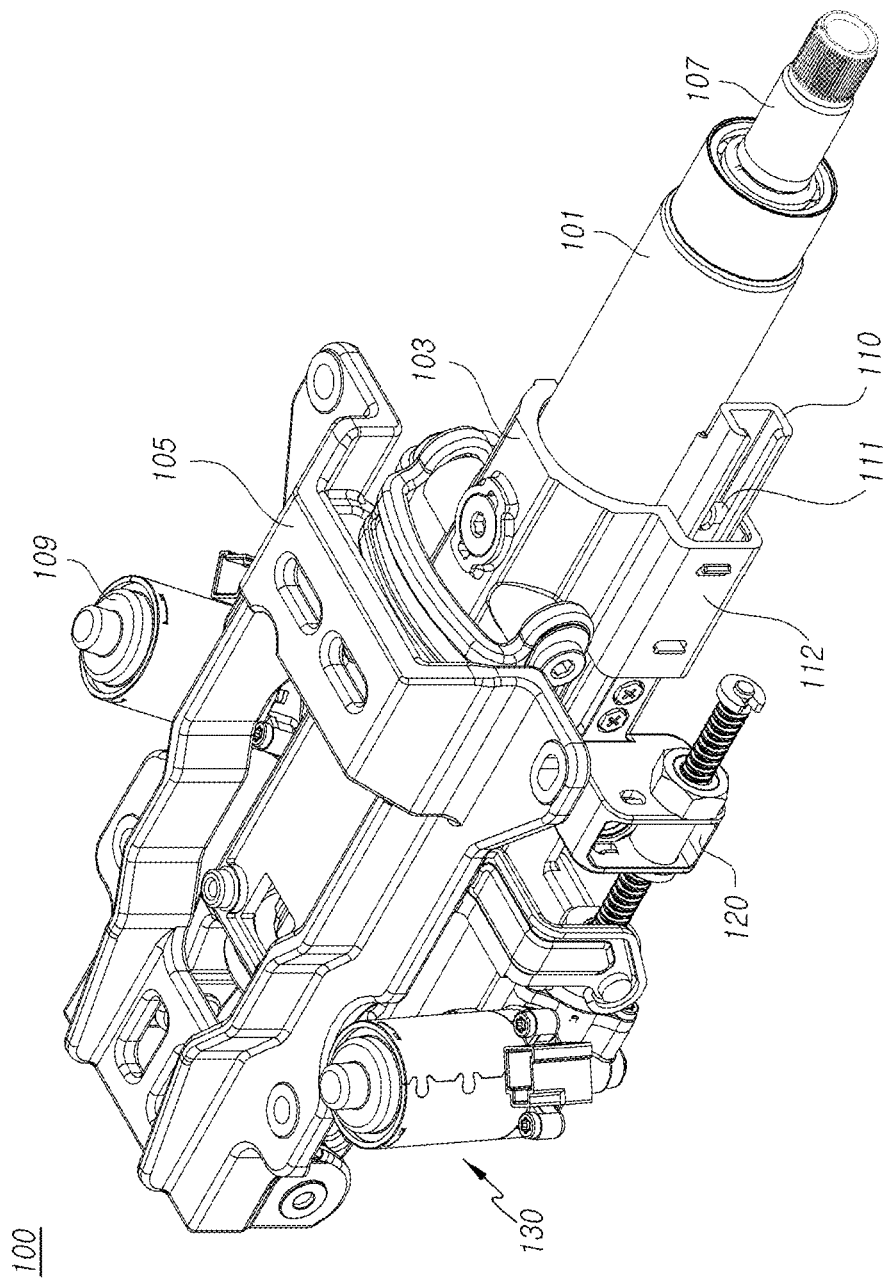
FIG. 1 is a perspective view of a vehicle steering column according to an embodiment of the present disclosure.

Hereinafter, embodiments of the present disclosure will be described with reference to exemplary diagrams. In the specification, in adding reference numerals to components throughout the drawings, it should be noted that like reference numerals designate like components even though components are shown in different drawings. Further, in describing embodiments of the present disclosure, well-known functions or constructions will not be described in detail since they may unnecessarily obscure the understanding of the present disclosure.

Further, terms such as 'first', 'second', 'A', 'B', '(a)', and '(b)' may be used for describing components of the present disclosure. These terms are used only for discriminating the components from other components, so the essence or order of the components indicated by those terms is not limited. It should be understood that when one element is referred to as being "connected to", "combined with" or "coupled to" another element, it may be connected directly to or coupled directly to another element, or another element may be "connected", "combined", or "coupled" between them.

Figure 2:
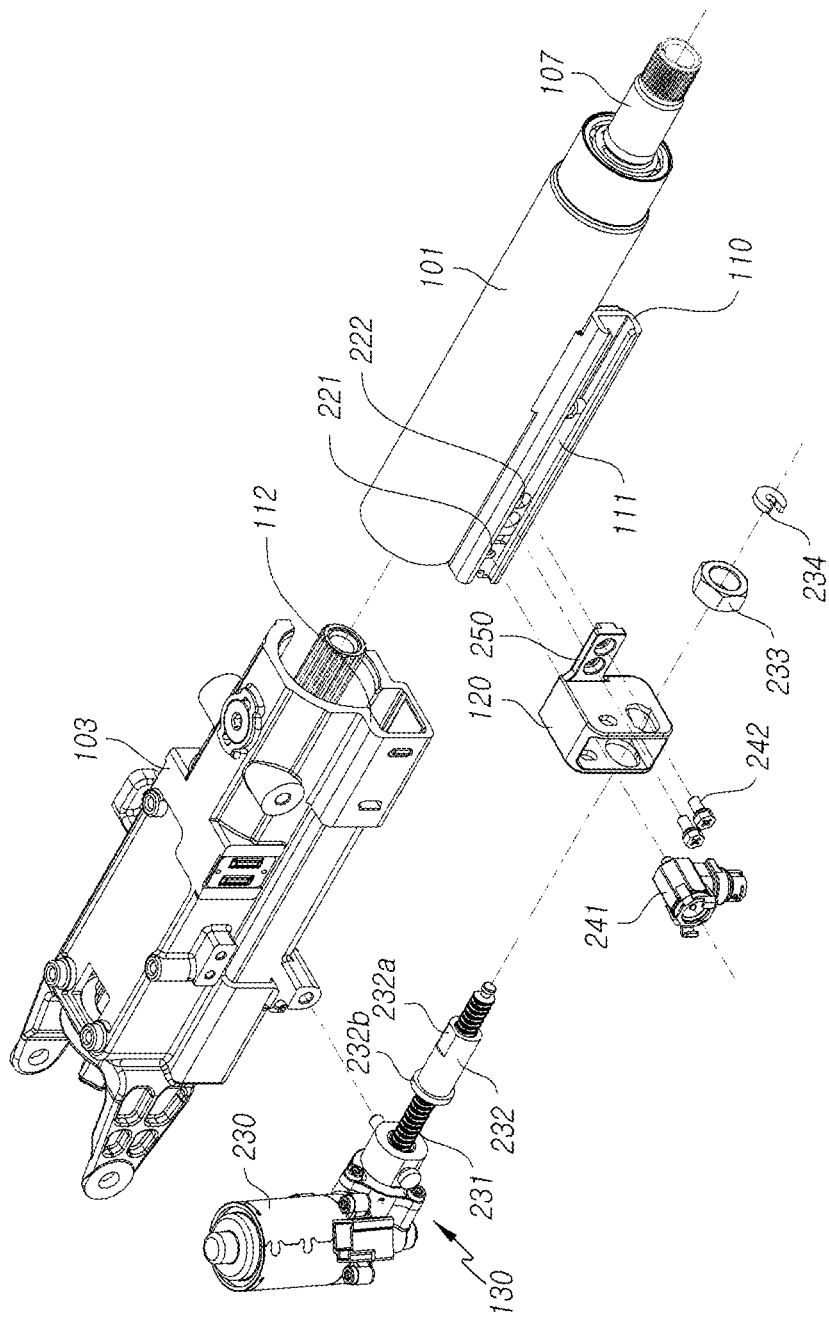
FIG. 2 is an exploded perspective view of the steering column according to FIG. 1.
Figure 3:
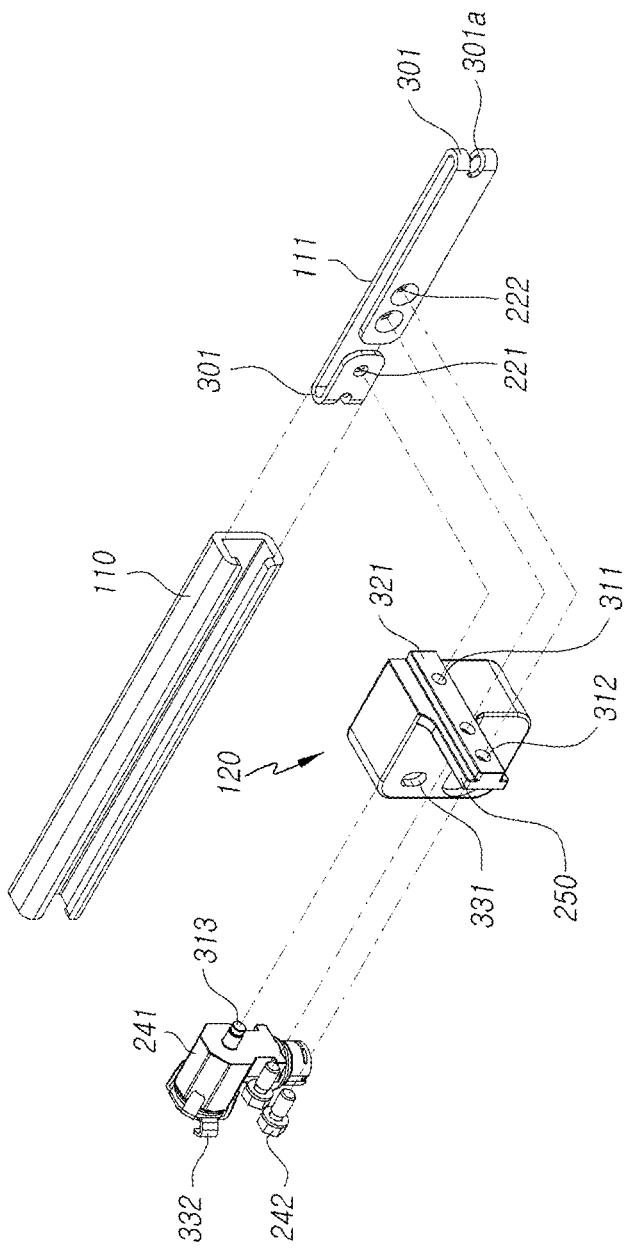
FIG. 3 is a perspective view for a part of the steering column according to FIG. 2.
Figure 5:
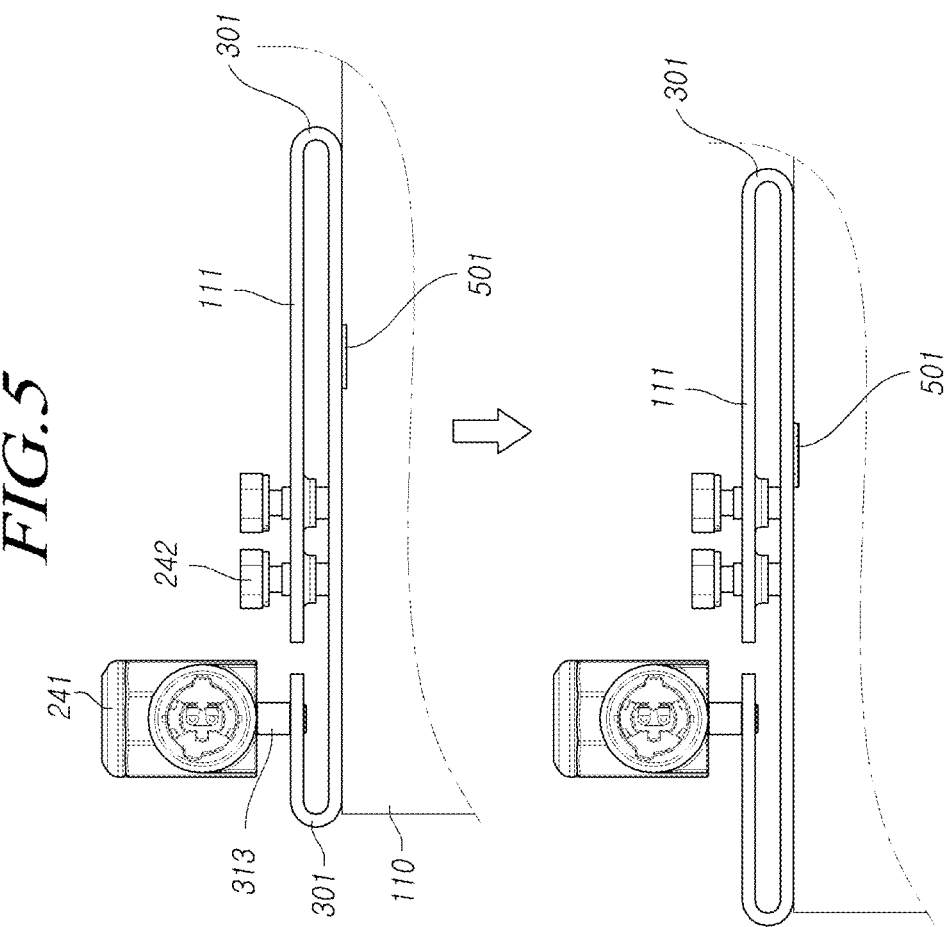
FIGS. 5 and 6 are side views illustrating the state in which parts of the steering column according to the present embodiments are collapsed.
Figure 6:
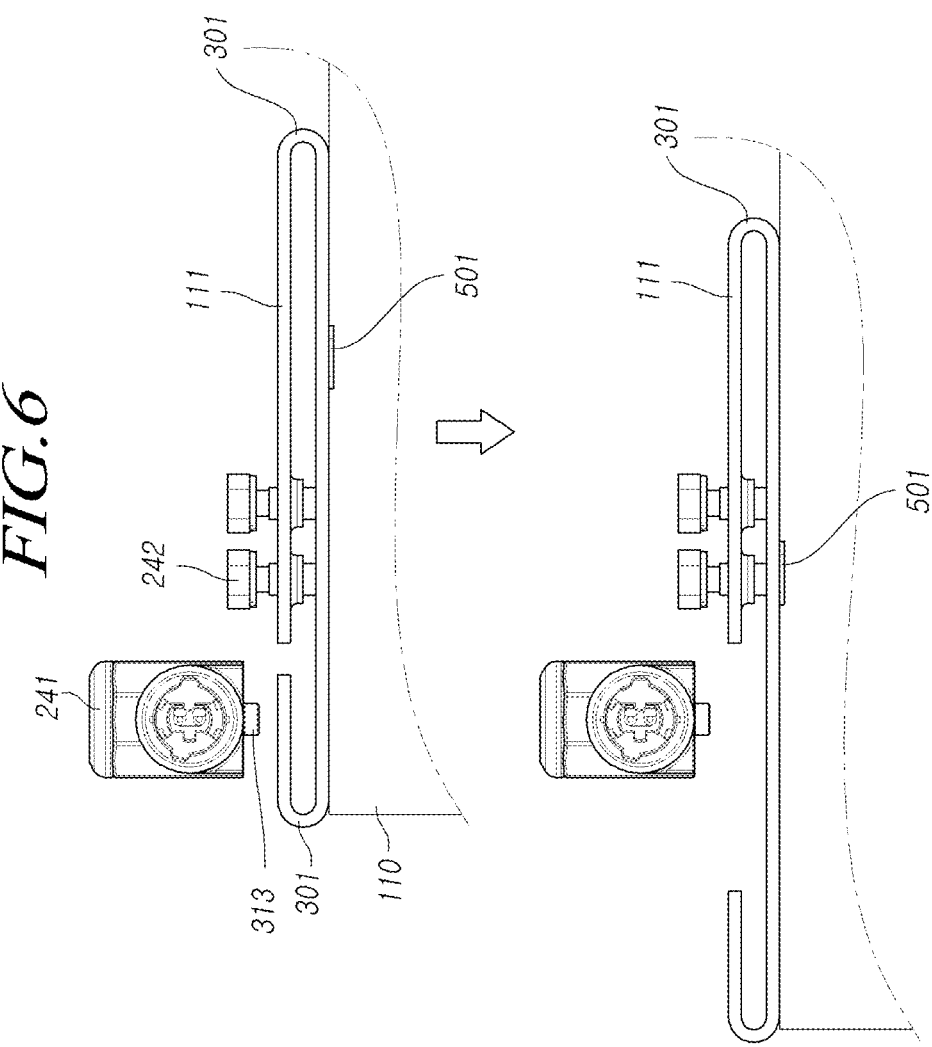
Figure 7:
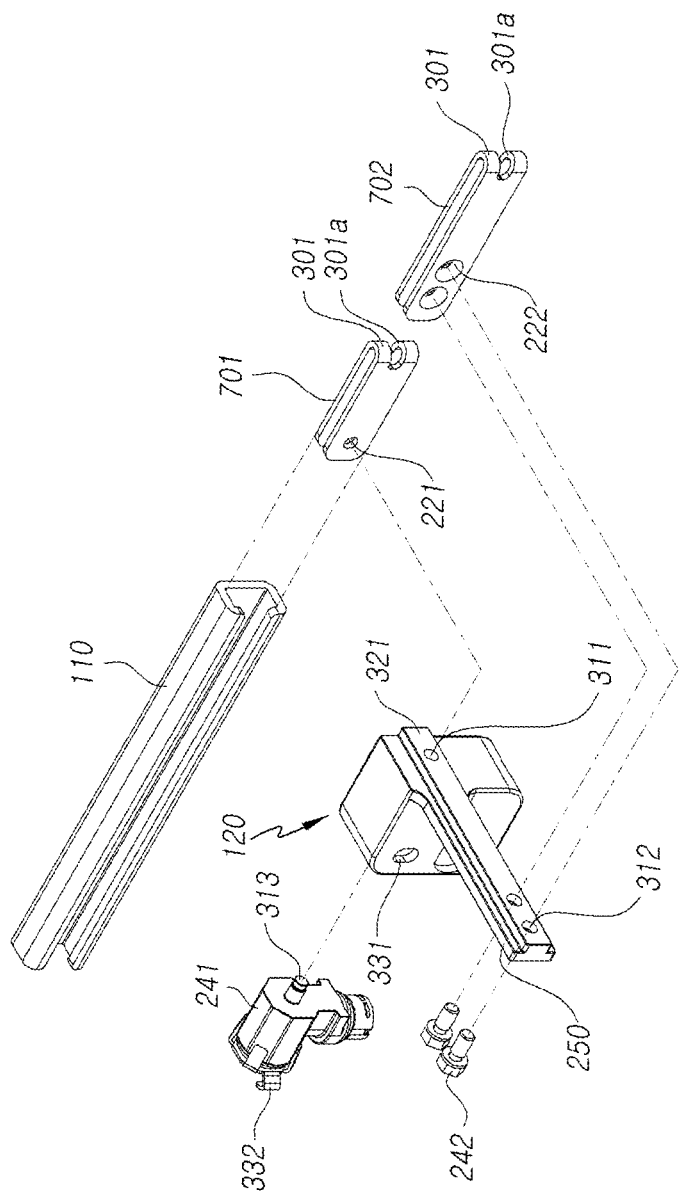
FIG. 7 is an exploded perspective view for a part of the steering column according to the present embodiments.
Figure 8:
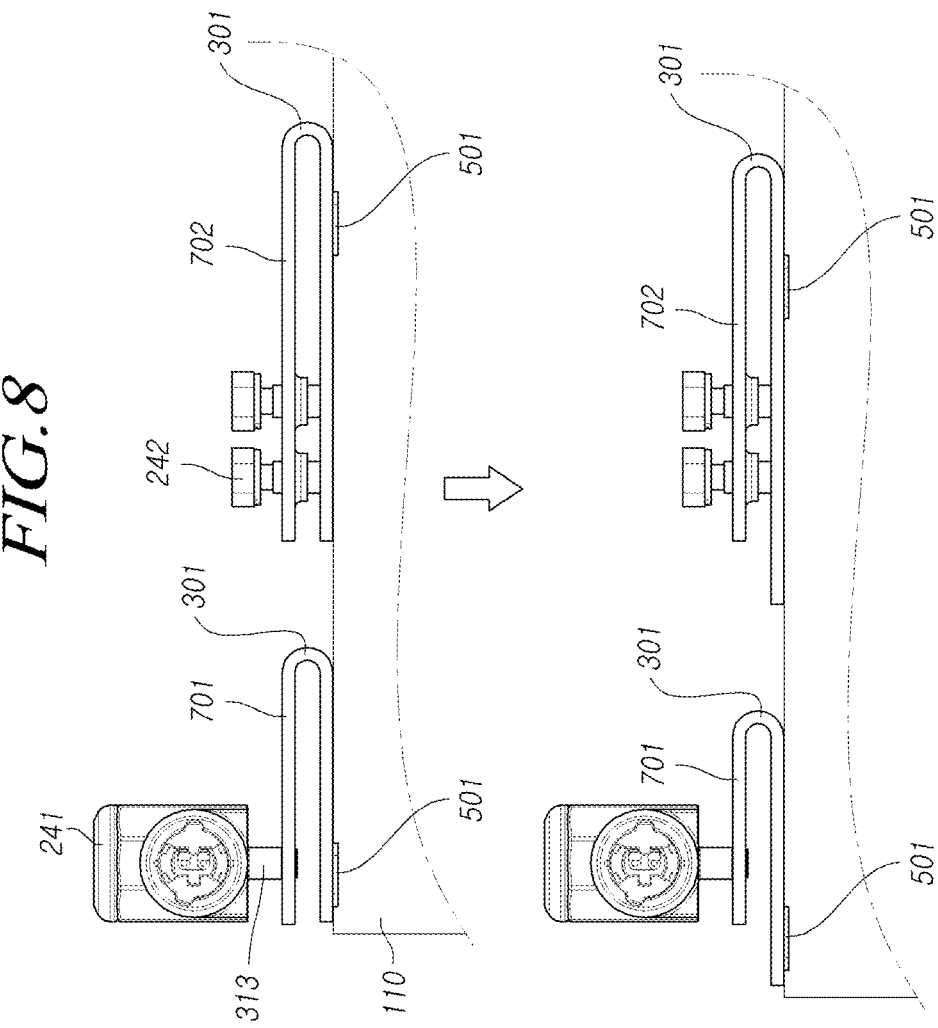
FIGS. 8 and 9 are side views illustrating the state in which parts of the steering column according to the present embodiments are collapsed.
Figure 9:
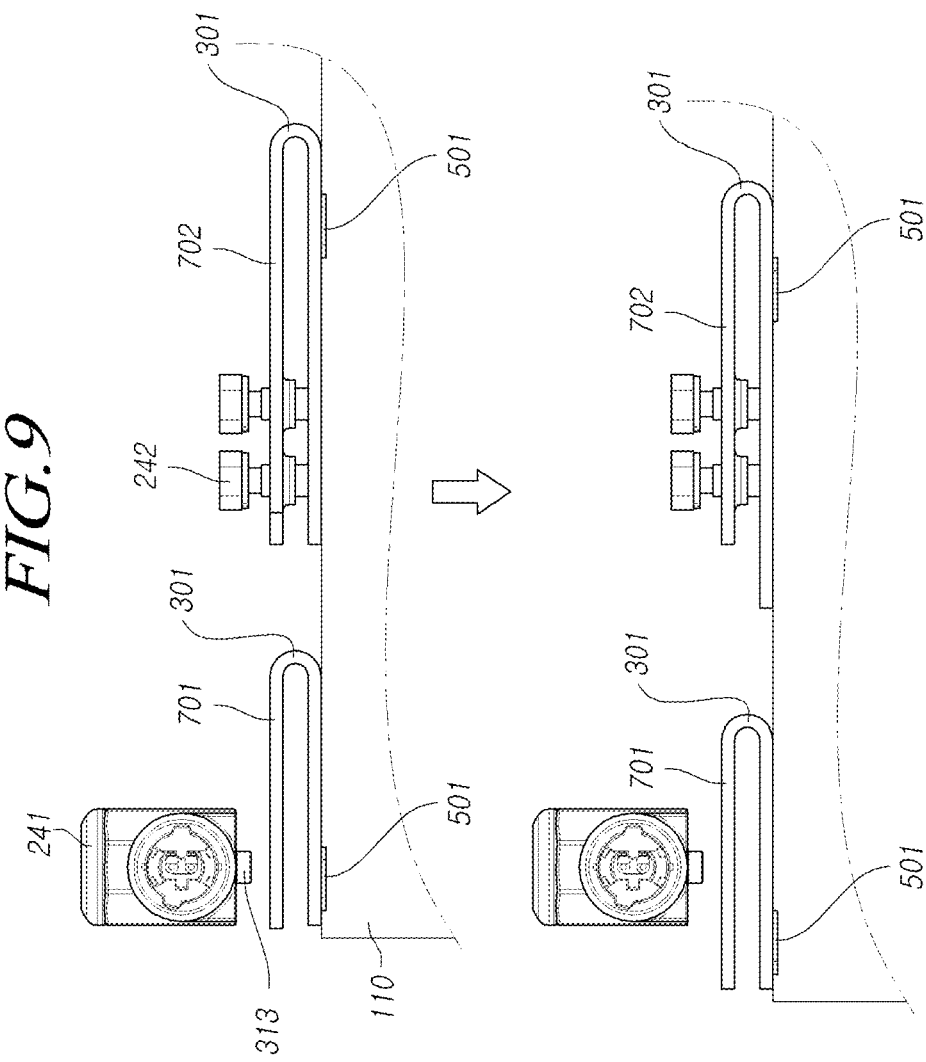
Figure 10:
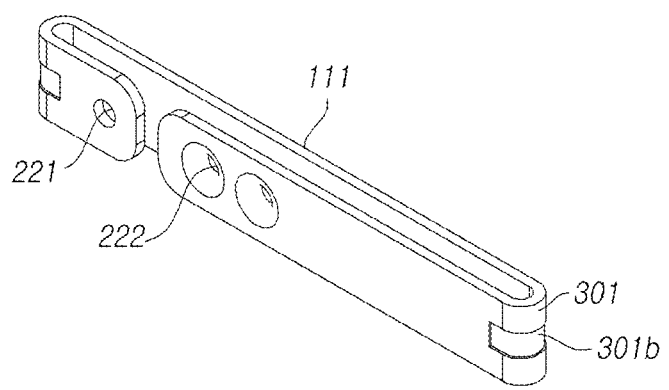
FIGS. 10 and 11 are a perspective view and a side view of a part of the steering column according to the present embodiments.
Figure 11:
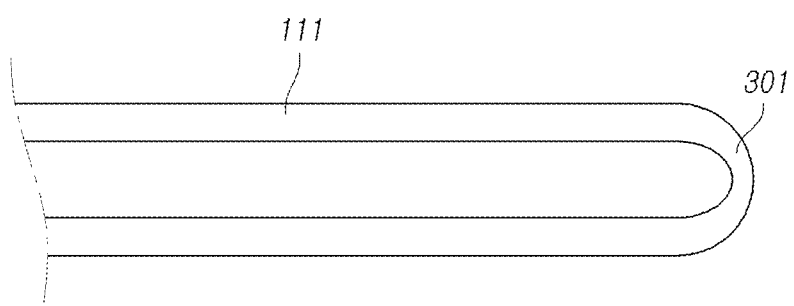
Figure 12:
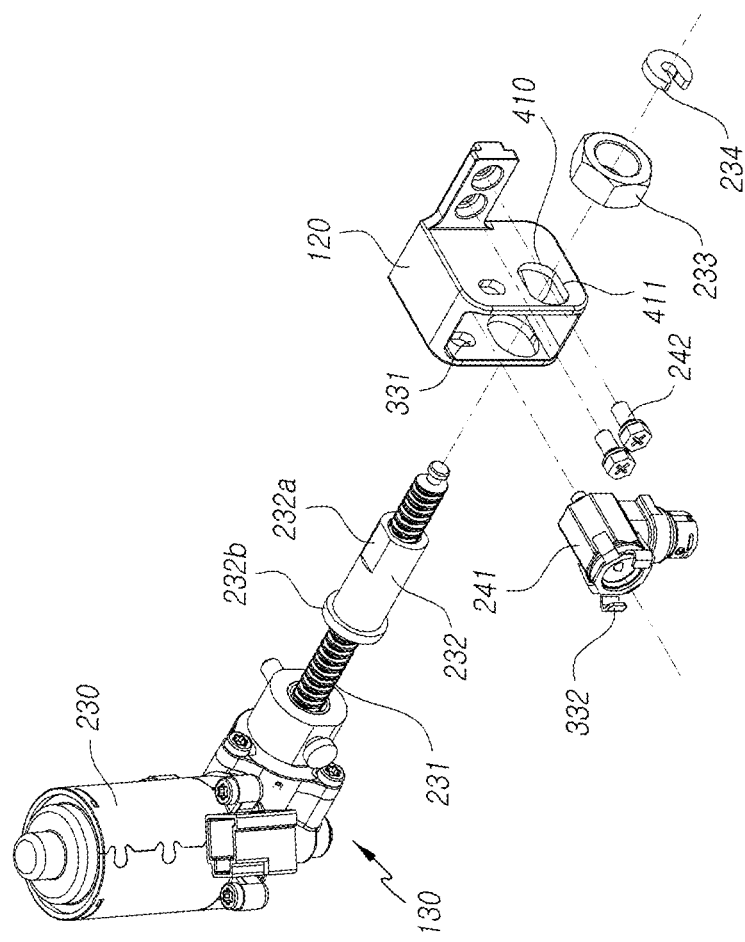
FIG. 12 is an exploded perspective view of a part of the steering column according to the present embodiments.

FIG. 1 is a perspective view of a vehicle steering column assembly according to an embodiment of the present disclosure, FIG. 2 is an exploded perspective view of the steering column assembly according to FIG. 1, FIG. 3 is a perspective view for a part of the steering column assembly according to FIG. 2, FIG. 4 is a side view of the coupled state of parts of the steering column assembly according to FIG. 3, FIGS. 5 and 6 are side views illustrating the state in which parts of the steering column assembly according to the present embodiments are collapsed, FIG. 7 is an exploded perspective view for a part of the steering column assembly according to the present embodiments, FIGS. 8 and 9 are side views illustrating the state in which parts of the steering column assembly according to the present embodiments are collapsed, FIGS. 10 and 11 are a perspective view and a side view of a part of the steering column assembly according to the present embodiments, FIG. 12 is an exploded perspective view of a part of the steering column assembly according to the present embodiments, and FIG. 13 is a side view illustrating the telescopic operating state of the steering column assembly according to the present embodiments.

Referring to these drawings, the steering column apparatus assembly 100 for the vehicle according to the present embodiment may include an upper column 101 to which a bracket 110 is fixed to an outer circumferential surface, a lower column 103 having an inner peripheral surface supported on the outer peripheral surface of the upper column 101 and having a telescopic driving device 130 fixed to a side corresponding to the bracket 110, a connecting member 120 coupled to the telescopic driving device 130 so as to be movable in the axial direction during a telescopic operation, and a bent plate 111 fixed to the bracket 110 and having one end being bent and spaced apart from a portion fixed to the bracket 110 and coupled to the connecting member 120.

The steering column 100 for the vehicle according to the present embodiment may be a vehicle steering column 100 in which the upper column 101 inserted in the lower column 103 is capable of telescoping or sliding in the axial direction. The steering column 100 may have a configuration in which the upper column 101 is collapsed to the lower column 103 in the event of the vehicle collision, thereby it is possible to absorb collision energy in the vehicle collision.

The upper column 101 may be provided on the outside of the steering shaft 107 to surround the steering shaft 107 that transmits the steering force when the driver operates the steering wheel. The upper column 101 may be inserted into the inner circumferential surface of the lower column 103 and may slide toward the lower column 103 in the event of the collision of the vehicle so that the collapse operation can be performed.

The lower column 103 which slidably accommodates the upper column 101 may be fixed to the vehicle body by using a mounting bracket 105.

The bracket 110 may be fixed to the outer circumferential surface of the upper column 101 and the telescopic driving device 130 to which the connecting member 120 is coupled may be fixed to the side of the lower column 103 corresponding to the bracket 110.

As a result, during the collapse of the steering column, the upper column 101 and the bracket 110 may slidably move axially inward of the lower column 103, and the connecting member 120, the telescopic driving device 130 and the lower column 103 may be fixed with respect to the vehicle body of the vehicle.

At this case, the bent plate 111 formed of a metal material and capable of being plastic-deformed may be attached to the bracket 110, and one end of the bending may be coupled to the connecting member 120.

Therefore, when the steering column is collapsed, since a portion of the bent plate fixed to the bracket 110 is moved in the axial direction and one end of the bent plate coupled to the connecting member 120 is fixed to the vehicle body, thereby it is possible to absorb the collision energy by the plastic deformation of the bent portion 301 of the bent plate 111.

The bent plate 111 may be provided with a fixing portion 501 which is fixed to the bracket 110 by welding or press fitting.

Since the connecting member 120 is movably coupled in the axial direction by the telescopic driving device 130, the bracket 110 supported by the bent plate 111 and the upper column 101 fixing the bracket 110 can move in the axial direction and the telescopic operation may be performed as the connecting member 120 moves in the axial direction.

At this case, the bent plate 111 may move in the axial direction together with the connecting member 120, the bracket 110 and the upper column 101, and the telescopic operation may be performed.

The connecting member 120 may include the engaging hole 410 formed in an axial direction to be coupled to the telescopic driving device 130 and connecting member 120 may include the first assembling hole 311 and the second assembling hole 312 to be coupled to the bent plate 111.

That is, the screw 231 of the telescopic driving device 130 and the first supporting member 232 may penetrate through the engaging hole 410 and may be supported by the connecting member 120. The first engaging member 241 is inserted into the first assembling hole 311 and the first coupling hole 221 and the second engaging member 242 is inserted into the second assembling hole 312 and the second coupling hole 222, thereby the connecting member 120 may be coupled to the bent plate 111. Details of this construction will be described later.

The bracket 110 may include a lower portion 421 coupled to the upper column 101 and support walls 422 disposed on both sides of the lower portion 421 in the width direction. The support wall 422 may be formed vertically to the opposite side of the upper column 101. The support wall 422 may support both sides of the bent plate 111 and may guide sliding of the bent plate 111 to prevent plastic deformation of the bent plate 111 in directions other than the axial direction.

In addition, the lower column 101 may include an expanded portion 112 having an inner peripheral surface extended from a side corresponding to the bracket 110, and the bracket 110 may move in an axial direction within the expanded portion 112, and both outer sides of the support walls 422 may be supported by the expanded portion 112. As a result, the sliding movement of the upper column 101 can be smoothly performed so as to improve the collision performance of the steering column.

The bent plate 111 may be provided with the first coupling hole 221 and the second coupling hole 222 and the connecting member 120 may be provided with the first assembling hole 311 and the second assembling hole 312. The bent plate 111 and the connecting member 120 may be coupled by the first engaging members 241 and second engaging members 242 via these coupling holes and assembling holes.

In the following description, a first embodiment in which both ends of the bent plate 111 as a single element are bent and a second embodiment in which the bent plate 111 includes the first bent plate (or first plate portion) 701 and the second bent plate (or second plate portion) 702 will be described.

In the first embodiment according to FIGS. 3 to 6, the bent plate 111 may be bent at one end as well as at the other end and may be coupled to the connecting member 120. The first coupling hole 221 may be formed in one end of the bent plate 111 and the second coupling hole 222 may be provided at the other end of the bent plate 111.

The connecting member 120 may include the first assembling hole 311 corresponding to the first coupling hole 221 and the second assembling hole 312 corresponding to the second coupling hole 222. The first engaging member 241 and the second engaging member 242 may supported on the connecting member 120 so that the connecting member 120 and the bent plate 111 may be coupled with each other.

Meanwhile, the connecting member 120 may include the body portion having one side being opened and for mounting the first engaging member 241, and the extension portion 250 extending in the axial direction in the body portion. At this case, the first assembling hole 311 may be disposed in the body portion and the second assembling hole 312 may be disposed in the extension portion 250.

The support portion 423 may be provided at an end portion of the support walls 422 opposite to the lower portion 421, and this support portion 423 may be formed to be parallel to the lower portion 421 and to be spaced apart from each other.

At this case, the connecting member 120 may be formed with a protruding portion 321 in the axial direction so as to be inserted between the support portions 423 so that both sides are supported, and the protruding portion 321 may be also provided in the extension portion 250.

As a result, the bracket 110 may be supported in the width direction by the protruding portion 321 of the connecting member 120 fixed to the vehicle body during the collapse of the steering column, thereby the sliding motion of the upper column 101 may be smoothly performed.

The first engaging member 241 supported by the connecting member 120 may be provided with a protrusion 313 penetrating the first assembling hole 311 and inserted into the first coupling hole 221 or retracted from in the first coupling hole 221, and, the second engaging member 242 may be inserted and coupled in the second assembling hole 312 and the second coupling hole 222. That is, the second engaging member 242 may be coupled to the bent plate 111 and the connecting member 120, and the first engaging member 241 may selectively support the bent plate 111 in the axial direction while being supported by the connecting member 120.

Referring to FIGS. 5 and 6, the number of bending portions 301 in which plastic deformation occurs may be changed depending on whether the protrusion 313 is inserted into the first coupling hole 221 during the collapse of the steering column.

According to FIG. 5, the protrusion 313 is inserted into the first coupling hole 221 and one end of the bent plate 111 is supported and fixed in the axial direction, thereby the plastic deformation may occur in both bending portions 301 disposed on both sides of the bent plate 111 in the case of the collapse.

Meanwhile, according to the embodiment of FIG. 6, the protrusion 313 is retract and removed from the first coupling hole 221 and one end of the bent plate 111 is not supported in the axial direction, so that the plastic deformation may occur only in one bending portion 301.

The protrusion 313 may be inserted into the first coupling hole 221 or removed from the first coupling hole 221 by controlling the first engaging member 241 by using the electronic control unit ECU of the vehicle. The first engaging member 241 may be implemented by using an inflator or a solenoid with a pin and the second engaging member 242 may be implemented by using a bolt or the like screwed into the threaded portion formed the second assembling hole 312 and the second coupling hole 222.

According to the above configuration, it is possible to improve the collision performance of the steering column by changing the number of the bending portions 301 to be plastically deformed during the collapse of the steering column depending on the collision characteristics of the vehicle and adjusting the impact load absorbed by the bent plate 111.

In addition, the insertion hole 331 may be formed in the body of the connecting member 120 and the insertion member 332 inserted and supported into the insertion hole 331 may be provided in the first engaging member 241 so that the first engaging member 241 may be supported on the connecting member 120

Hereinafter, another embodiment will be described with reference to FIGS. 4 and 7 to 9.

In this embodiment, the bent plate 111 may include the first bent plate (or first plate portion) 701 and the second bent plate (or second plate portion) 702. The first bent plate 701 may include the first coupling hole 221 at one end of the first bent plate and the second coupling hole 222 may be provided at one end of the second bent plate 702.

That is, the first bent plate 701 may be coupled to the first engaging member 241 and the second bent plate 702 may be coupled to the second engaging member 242. In this case, the second bent plate 702 may be coupled to the connecting member 120 by adjusting the length of the extension portion 250 in which the second assembling hole 312 is formed.

The first engaging member 241 may include the protrusion 313 penetrating through the first assembling hole 311 and inserted into the first coupling hole 221 or retraced from the first coupling hole 221. The second engaging member 242 may be inserted and supported into the second coupling hole 221 and the second assembling hole 312.

As a result, in the state of FIG. 8, the protrusion 313 is inserted into the first coupling hole 221 and one end of the first bent plate 701 is fixed in the axial direction, thereby the plastic deformation may occur in both the first bent plate 701 and the second bent plate 702 in the collapse of the steering column.

On the other hand, in the state of FIG. 9, one end of the first bent plate 701 is not fixed in the axial direction since the protrusion 313 is retracted and disengaged from the first coupling hole 221, thereby the plastic deformation may occur only at the second bent plate 702 in the collapse of the steering column.

In addition, according the embodiments of FIGS. 3, 10 and 11, the bent plate 111 may include the hole 301a or the concave groove 301*b* along the curved surface of the bending portion 301 of the bent plate.

Alternatively, the thickness of the bent plate may become thinner toward the center of the bending portion 301 from the portion where the bending starts.

Accordingly, the rigidity of the bending portion 301 of the bent plate may be smaller than the other portions of the bent plate 111, which may be applied to the first bent plate 701 and the second bent plate 702.

As a result, the initial collapse of the steering column may be easily performed during the initial condition of the vehicle collision by reducing the rigidity of the bending portion 301 where the plastic deformation first occurs at the time of collision.

Referring to FIG. 12, the connecting member 120 may be provided with the engaging hole 410 formed in an axial direction. The telescopic driving device 130 may include the motor 230, the screw 231 rotated by the motor 230, the first supporting member 232 screwed to the screw 231, inserted into the engaging hole 410 and supported on one side of the connecting member 120, and the second supporting member 233 coupled to the first supporting member 232 and supported on the other side of the connecting member 120.

That is, the first supporting member 232 and the second supporting member 233 supporting one side and the other side of the connecting member 120 may be moved in the axial direction by the rotation of the screw 231 to perform the telescopic operation.

The first supporting member 232 may be formed with the engagement portion 232*b* to support one side of the connecting member 120. The engagement portion 232*b* may be formed by protruding radially from the end of the first supporting member 232.

Since the first supporting member 232 should be fixed in the circumferential direction in order to move in the axial direction by the rotation of the screw 231, the first supporting member 232 may include the flat surface 232*a* on an outer circumferential surface of the first supporting member, and the rotation stopper 411 supported by the flat surface portion 232*a* may be formed at the engaging hole 410.

The flat surface 232*a* may be formed on the outer circumferential surface of the first supporting member 232 in the form of a cylindrical shape and the rotation stopper 411 may be formed on the inner circumferential surface of the engaging hole 410 in the form of a circular shape.

The first supporting member 232 may protrude from the other side of the connecting member 120 through the engaging hole 410, and the second supporting member 233 may be supported on the other side of the connecting member 120 and may be coupled to the protruding portion of the first supporting member 232. The second supporting member 233 may be threaded to the outer peripheral surface of the first supporting member 232.

That is, the second supporting member 233 may be coupled to the first supporting member 232 that is not rotated by the rotation stopper 411 and may be supported on the other side of the connecting member 120, so that the second supporting member 233 may move in the axial direction and the telescopic operation may be performed due to the rotation of the screw 231.

The stopper 234 may be coupled to the end of the screw 231 on the side of the second supporting member 233, thereby the range of telescopic operation may be restricted.

FIG. 13 illustrates the telescopic operating state of the steering column by the telescopic driving device 130.

Referring to FIG. 13, the connecting member 120 may be supported by the first supporting member 232 and the second supporting member 233 by the rotation of the screw 231 and may slide in the axial direction (A) together with the bent plate 111, the bracket 110 and the upper column 101.

According to the embodiments with the structure and the configuration as above, the collapsed part and the fixed part of the steering column may be collapsed smoothly without interfering with each other in the case of the vehicle collision.

In addition, it is possible to reduce the number of components of the steering column and to reduce the number of assembly processes and the manufacturing costs.

In addition, it is possible to improve the collision performance by adjusting the impact load of the steering column in the vehicle collision based on the collision characteristic including type of the vehicle, the running state and so on.

Even though all components of embodiments of the present disclosure were described as being combined in a single part or being operated in cooperation with each other, the present disclosure is not limited thereto.

That is, all the components may be selectively combined one or more parts and operated if it is within the object of the present disclosure. Further, all of the components may be implemented by single independent hardware, respectively, but some or all of the components may be selectively combined and implemented by computer programs having a program module that performs some or all of functions combined by one or more pieces of hardware. Codes or code segments constituting the computer programs may be easily inferred by those skilled in the art. The computer programs are stored in computer-readable media and read and executed by a computer, whereby embodiments of the present disclosure can be achieved. A magnetic storing medium, an optical recording medium, and a carrier wave medium may be included in the recording media of computer programs.

The above description is an example that explains the spirit of the present disclosure and may be changed and modified in various ways without departing from the basic features of the present disclosure by those skilled in the art. Accordingly, the embodiment described herein are provided not to limit, but to explain the spirit of the present disclosure and the spirit and the scope of the present disclosure are not limited by the embodiments. The protective range of the present disclosure should be construed on the basis of claims and all the technical spirits in the equivalent range should be construed as being included in the scope of the right of the present disclosure.

What is claimed is:

1. A steering column assembly for a vehicle, comprising:
   an upper column, wherein a bracket is fixed to an outer peripheral surface of the upper column;
   a lower column having an inner peripheral surface slidably supporting the outer peripheral surface of the upper column, wherein a telescopic driving device is fixed to the lower column;
   a connecting member movably coupled to the telescopic driving device; and
   a bent plate fixed to the bracket, wherein one end portion of the bent plate is bent from a portion of the bent plate fixed to the bracket and coupled to the connecting member and an other end portion of the bent plate is bent from the portion of the bent plate fixed to the bracket and coupled to the connecting member.

2. The steering column assembly of claim 1, wherein the bracket includes:
   a portion coupled to the upper column; and support walls extended from sides of the coupled portion of the bracket in a direction away from the coupled portion of the bracket.

3. The steering column assembly of claim 2, wherein the lower column includes an expanded portion having an inner peripheral surface forming a space configured to receive the bracket, and wherein the bracket is slidable within the expanded portion, and the support walls of the bracket are supported by the expanded portion of the lower column.

4. The steering column assembly of claim 1, wherein the bent plate includes a first coupling hole at the one end portion and a second coupling hole at the other end portion, and the connecting member includes a first assembling hole corresponding to the first coupling hole and a second assembling hole corresponding to the second coupling hole.

5. The steering column assembly of claim 4, wherein the connecting member includes a first engaging member, and the first engaging member includes a protrusion penetrating the first assembling hole and configured to be movable to be inserted into the first coupling hole of the bent plate or removed from the first coupling hole of the bent plate.

6. The steering column assembly of claim 5, wherein the connecting member includes a second engaging member fixed in the second assembling hole and the second coupling hole of the bent plate.

7. The steering column assembly of claim 1, wherein the bent plate includes a hole or a groove on a curved surface of a bent portion of the bent plate.

8. The steering column assembly of claim 1, wherein a thickness of the bent plate decreases toward a center of a bent portion of the bent plate.

9. The steering column assembly of claim 1, wherein the connecting member includes an engaging hole, and wherein the telescopic driving device includes:
a motor;
a screw configured to be rotatable by the motor;
a first supporting member movably coupled to the screw, inserted in the engaging hole of the connecting member, and disposed at one side of the connecting member; and
a second supporting member coupled to the first supporting member and disposed at an other side of the connecting member.

10. The steering column assembly of claim 9, wherein the first supporting member includes an engagement portion supporting the one side of the connecting member.

11. The steering column assembly of claim 10, wherein the first supporting member includes a flat surface on an outer circumferential surface of the first supporting member, and a rotation stopper associated with the flat surface portion is formed at the engaging hole of the connecting member.

12. The steering column assembly of claim 10, wherein the first supporting member is protruded to the other side of the connecting member through the engaging hole, and the second supporting member is disposed at the other side of the connecting member and coupled to the first supporting member.

13. The steering column assembly of claim 9, wherein a stopper is coupled to an end of the screw.

14. A steering column assembly for a vehicle, comprising:
an upper column, wherein a bracket is fixed to an outer peripheral surface of the upper column;
a lower column having an inner peripheral surface slidably supporting the outer peripheral surface of the upper column, a telescopic driving device is fixed to the lower column;
a connecting member movably coupled to the telescopic driving device; and
a first bent plate and a second bent plate fixed to the bracket, wherein the first bent plate includes a first coupling hole, the second bent plate includes a second coupling hole, and the connecting member includes a first assembling hole corresponding to the first coupling hole and a second assembling hole corresponding to the second coupling hole.

15. The steering column assembly of claim 14, wherein the connecting member includes a first engaging member, and the first engaging member includes a protrusion penetrating the first assembling hole and configured to be movable to be inserted into the first coupling hole of the first bent plate or removed from the first coupling hole of the first bent plate.

16. The steering column assembly of claim 15, wherein the connecting member includes a second engaging member fixed in the second assembling hole and the second coupling hole of the second bent plate.

\* \* \* \* \*